(12) United States Patent
Nissen et al.

(10) Patent No.: US 6,799,652 B2
(45) Date of Patent: Oct. 5, 2004

(54) METHOD FOR INFLUENCING THE TORQUE ON AT LEAST ONE DRIVING WHEEL OF AN INDUSTRIAL TRUCK

(75) Inventors: Nis-Georg Nissen, Henstedt-Ulzburg (DE); Ralf Baginski, Neetze (DE); Frank Mānken, Henstedt-Ulzburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 164 days.

(21) Appl. No.: 10/051,326

(22) Filed: Jan. 18, 2002

(65) Prior Publication Data

US 2002/0129985 A1 Sep. 19, 2002

(30) Foreign Application Priority Data

Jan. 20, 2001 (DE) .......................................... 101 02 523

(51) Int. Cl.[7] .................................................. B60L 3/10
(52) U.S. Cl. ......................... 180/197; 180/213; 701/90
(58) Field of Search ................................. 180/197, 211, 180/213, 214; 701/82, 83, 84, 90, 22

(56) References Cited

U.S. PATENT DOCUMENTS

| | | | |
|---|---|---|---|
| 5,278,761 A | * | 1/1994 | Ander et al. .................. 701/84 |
| 5,388,658 A | * | 2/1995 | Ando et al. .................. 180/197 |
| 5,419,624 A | * | 5/1995 | Adler et al. .................. 303/112 |
| 6,005,358 A | * | 12/1999 | Radev .......................... 318/139 |
| 2003/0127289 A1 | * | 7/2003 | Elgas et al. .................. 187/224 |

FOREIGN PATENT DOCUMENTS

| | | | |
|---|---|---|---|
| DE | 1806671 | | 7/1970 |
| DE | 4021985 A1 | | 1/1991 |
| DE | 4432620 A1 | | 4/1996 |
| DE | 19843826 A1 | | 3/2000 |
| GB | 2293148 | * | 3/1996 |

* cited by examiner

*Primary Examiner*—Anne Marie Boehler
(74) *Attorney, Agent, or Firm*—Faegre & Benson LLP

(57) ABSTRACT

A method for influencing the torque on at least one driving wheel of an industrial truck for the purpose of driving and/or braking it wherein the torque of a driving motor for the industrial truck is reduced by means of a slip regulator at an appropriate amount depending on the slip by determining the slip between the driving wheel and the floor by making a comparison of the circumferential speed measured or calculated for the driving wheel and the vehicle travelling speed measured for the industrial truck, and comparing it to a set-point.

23 Claims, 1 Drawing Sheet

METHOD FOR INFLUENCING THE TORQUE ON AT LEAST ONE DRIVING WHEEL OF AN INDUSTRIAL TRUCK

This application claims priority under 35 U.S.C. 119 to German Patent Application No. 10102523.8, filed in the German Patent Office on Jan. 20, 2001.

The invention relates to a method for influencing the torque on at least one driving wheel of an industrial truck for the purpose of driving and/or braking it.

If the ground is in a slippery condition or loads are inappropriately distributed the problem which is frequently encountered in industrial trucks is that the driving wheel or driving wheels will slip. Furthermore, since the driven wheel frequently is also the wheel to be steered such a slip leads to poor manoeuvring characteristics. In addition, the slip causes an increase in wear to the tyres or their surfaces. The efficiency of the drive deteriorates drastically because the driving power is not turned into kinetic energy. Accordingly, this reduces the kinetic energy which can be recovered during a braking operation. If braking is done via the drive an increase in slip will naturally lead to a clear reduction of the braking torque.

The use of so-called anti-lock braking systems has generally become known from the automotive industry. The slip is determined during braking and, hence, an appropriate action onto the braking system prevents the slip from assuming excessively large rates, specifically in order to avoid a lock-up.

Although it is known for industrial trucks to employ mechanical brakes to act onto the driving wheels braking is frequently performed via the drive in industrial trucks driven by electric motors or even by hydraulic power.

Therefore, it is the object of the invention to provide a method by which the torque acting on the driving wheel of an industrial truck can be influenced, as a function of slip, for the purpose of driving and/or braking it.

The inventive method relies on an industrial truck in which the desired torque of the drive is adjusted by making a comparison of the driving rpm and a set-point adjuster. This is frequently done by the vehicle driver actuating the motor controller or a pedal, by which action a desired torque is preset for the drive depending on the wheel deflection and the respective working order, e.g. via an rpm governor which are usually possessed by such vehicles. According to the invention, the absolute value of this desired torque is reduced by a slip-dependent corrective moment. It is understood that the driving torque may have different signs which depend on whether the vehicle is in a driving or braking order during its forward or backward travel (four-quadrant operation). The corrective moment results from the respective slip that exists and is produced in the output of a slip regulator. The input of the slip regulator is acted on by a differential from a set-point of the slip and an actual value of the slip. The actual value of the slip naturally is a differential between the travelling speed of the vehicle and the circumferential speed of the driving wheel. The larger the slip is the larger will be the corrective moment so that it is sure anyway that the torque which is the respective optimum will be applied to the driving wheel or the braked wheel.

The inventive method functions safely and is independent on the various working orders. However, it requires that a desired slip be preset. If a study is made on the frictional behavior of a wheel depending on the slip the result will be that there is an optimum slip which depends on the friction pairing and will achieve most favourable conditions of friction with the ground or floor. Therefore, if possible, the desired slip will be a value which corresponds to the optimum slip, but can also differ more or less heavily from the optimum slip. The essential thing, however, is that the desired slip should not be exceeded significantly. If this is the case after all the slip regulator will act and reduce the motor torque.

The slip regulator is not used as long as the critical slip is not reached yet.

The inventive method is preferably applied to an industrial truck the drive of which is constituted by an electric motor or a combustion engine having a hydrostatic transmission with a three-phase a.c. motor being preferably provided if an electric motor is used.

In another aspect of the invention, the inventive method is preferably applied to an rpm governor which produces the desired torque for the driving motor.

In another aspect of the invention, the vehicle travelling speed of the industrial truck is determined from the number of revolutions of a non-driven wheel of the industrial truck. However, other ways of measuring speeds are possible as well. Thus, for example, an acceleration sensor may be provided with a need to integrate the vehicle acceleration to form the actual vehicle travelling speed. Further, sensors can be imagined that measure the vehicle travelling speed directly with respect to the surrounding area such as the floor, e.g. radar sensors, microwave sensors, optical or image-processing sensors, etc.

Determining the driving number of revolutions in the above described way allows to determine the slip at any time during a straight-line travel. If the slip is also to be determined during a cornering it is either required to incorporate the actual steering angle into the calculation or to perform a measurement of the speed in at least two points of the vehicle in order to determine the speed vector on the driving wheel or driving wheels in this way. In an aspect of the invention, the number of revolutions of the non-driven wheels, the steering angle of the driving wheel, the centre distance between the non-driven wheels, and the distance between the axle of the non-driven wheels and the driving wheel are used to ascertain the reference speed and this speed serves for determining the circumferential component of the driven wheel in order to establish the slip on the driving wheel.

The desired slip may be preset or determined for a certain constitution of the driving wheel. However, it is also imaginable to vary the desired slip according to the conditions around it. This is preferably done in a model-based manner by determining certain parameters during the operation of the vehicle.

If the reference speed causing a lateral drift of the vehicle is determined for steered driving wheels a detection of the axial slip may be a measure to prevent any further increase in the steering angle or even to decrease it with a view to prevent the lateral slip from rising beyond a preset degree. However, this requires a steering control.

The invention will now be explained in more detail with reference to an embodiment shown in the drawings.

Figure 1:
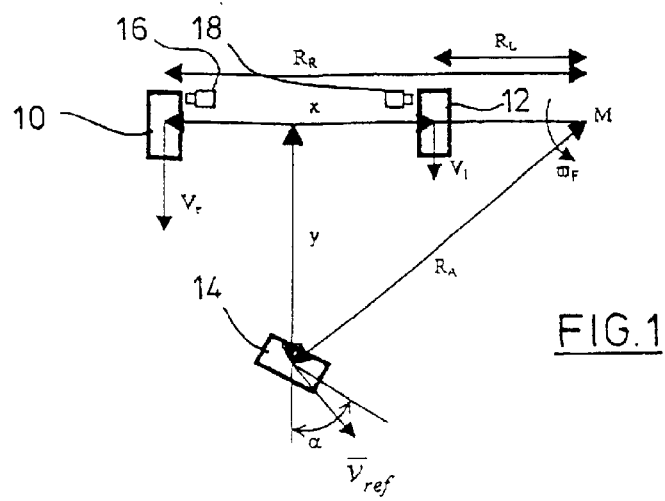
FIG. 1 shows the arrangement of the wheels of a three-wheel industrial truck by using means of realizing the inventive method.

FIG. 1 illustrates the wheel arrangement of a three-wheel industrial truck. Two non-driven wheels 10, 12 can be seen there on a common non-driven axle. In addition, a steered wheel 14 can be seen which constitutes a driving wheel and also a braked wheel. Associated with the wheels 10, 12 are sensors 16, 18 which measure the number of revolutions of the wheels and their circumferential speed. This speed is designated by $V_r$ and $V_l$, respectively. The wheelbase between wheels 10, 12 is indicated by x. The distance between the steering axle of the driven wheel 14 and the axle is indicated by y. The radius between the axle of the driven wheel 14 and the roll centre M is designated by $R_A$ whereas the distance between the wheel 10 and the roll centre is designated by $R_R$ and the one between the wheel 12 and the roll centre is designated by $R_L$. The vehicle angular velocity is indicated as $\omega_F$.

The conditions for the slip of the wheel 14 are generally characterized by the formula which follows:

$$s = f(\omega_a \cdot r_a, \overline{V}_{ref}) = \omega_a \cdot r_a - V_{ref,u}$$

The following relations apply to the case of FIG. 1:

$$|\overline{V}_{ref}| = \varpi_F \cdot R_A$$

$$\overline{V}_{ref} = \begin{pmatrix} \dfrac{y}{x}(v_r - v_l) \\ \dfrac{1}{2}(v_r + v_l) \end{pmatrix}$$

$$v_{ref,u} = \dfrac{y}{x}(v_r - v_l) \cdot \sin(\alpha) + \dfrac{1}{2}(v_r + v_l) \cdot \cos\alpha$$

$$v_{ref,a} = \dfrac{y}{x}(v_l - v_r) \cdot \cos(\alpha) + \dfrac{1}{2}(v_r + v_l) \cdot \sin\alpha$$

In these relations,
M is the roll centre
$V_L$ is the rpm of the left-hand load-bearing wheel
$V_R$ is the rpm of the right-hand load-bearing wheel
$\overline{V}_{ref}$ is the reference speed of the drive
$\omega_F$ is the vehicle angular velocity
R are the distances from M
x is the axle base
y is the wheel base
$\alpha$ is the steering angle
$\overline{V}_{ref,u}$ is the circumferential component of $\overline{V}_{ref}$
$\overline{V}_{ref,a}$ is the axial component of $\overline{V}_{ref}$ The reference speed thus determined for the vehicle on the driving wheel can serve for determining the slip by making a comparison to the number of revolutions of the driving wheel (according to the formula $s = \omega_A \cdot r_A - \overline{V}_{ref}$). If positive torques are produced (in a forward direction) such as in driving forwards and braking backwards a positive slip will result. On the contrary, if torques are produced in a backward direction (in braking during a forward travel and driving in a backward travel) a negative slip will result.

Figure 2:
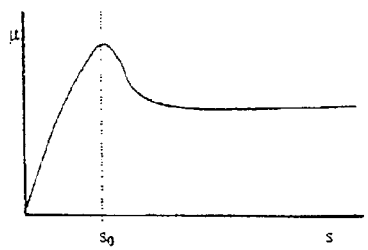
FIG. 2 shows a graph of the frictional behavior as a function of the slip.

The slip and frictional behavior of the driven wheel 14 depends on its tyres and the floor or ground below them (frictional pairing). As is apparent from FIG. 2 there is an optimum slip at which friction is at maximum. While the wheel 14 is driven or braked this slip value $S_0$ may not be exceeded if the most favourable acceleration values are to be achieved for the vehicle or an instable range and, hence, a clutch slip is to be avoided.

Figure 3:
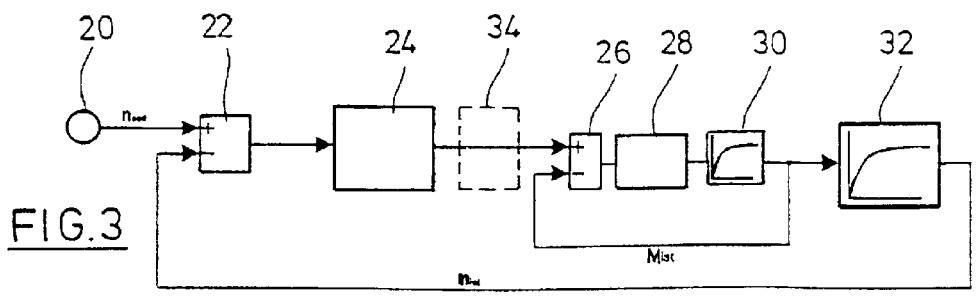
FIG. 3 shows a conventional drive regulation of an industrial truck.

FIG. 3 outlines a conventional drive regulation for an industrial truck, e.g. the wheel 14. An "accelerator" 20, for example, is used to preset an rpm set-point $n_{soll}$ which is compared to the actual value of the number of revolutions in an rpm set-point-actual value comparator 22. The actual number of revolutions $n_{ist}$ is determined in a conventional way. The deviation from the rule arrives at an rpm governor 24 which presets a set-point $M_{soll,n}$ for the drive torque. The desired torque is provided to an rpm set-point-actual value comparator 26 the output of which is provided to a torque governor 28. The torque governor 28 produces an adjustable point for the drive 30 of the industrial truck, e.g. a three-phase a.c. motor in the electric drive lane or a pressure source (a variable displacement pump) in the hydrostatic drive lane. Block 30 describes the transfer behavior of the drive. Block 32 represents the vehicle the speed of which is not always proportional to the number of revolutions of the motor 30 because there will be a slip even in case of a straight-line travel and the number of revolutions is not proportional to the vehicle speed specifically in cornering. The actual torque value $M_{ist}$ of the drive 30 is returned to the rpm set-point-actual value comparator 26. If there is an electric drive the torque-forming current is returned as a torque-describing value. If there is a hydrostatic drive the pressure will be returned in the drive lane concerned.

Figure 4:
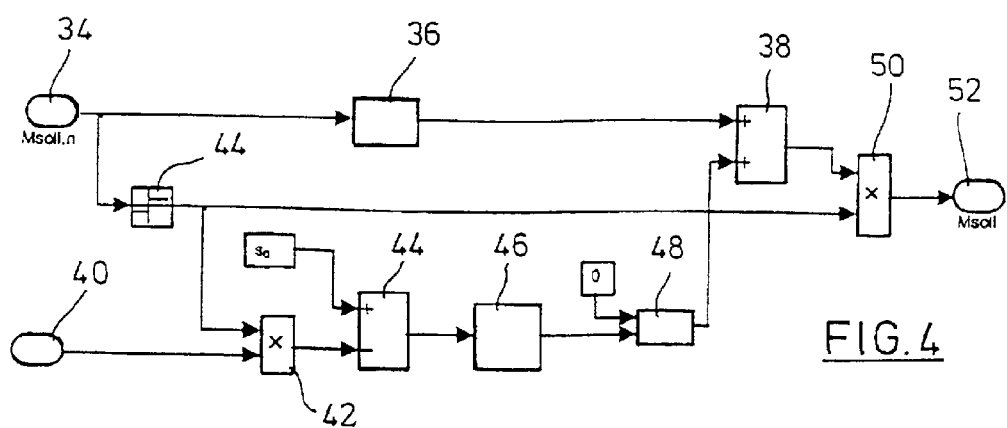
FIG. 4 shows a regulator for regulating the slip for the drive control of FIG. 3.

If there is a drive regulation according to the invention a reduction of the torques on the drive takes place in block 34, the details of which are shown more clearly in FIG. 4.

As is outlined at 34*a* the output of the rpm governor $M_{soll,n}$ gets onto a summing member 38 via a block 36. The sole function of the block 36 is to form the absolute value of the torque set-point which as is known can be positive or negative, which depends on the quadrant in which the drive 14 is operated. A actual value of the slip at the input 40 is multiplied, in a multiplication member 42, by the sign of the desired torque required of the rpm governor. The sign of the desired torque $M_{soll,n}$ is determined in the block 44. The actual value of the slip is determined in the above manner, i.e. it is found out what the difference is between the vehicle travelling speed and the circumferential speed of the driven wheel 14. The slip measured is given the respective sign of the torque from the rpm governor 24. In a summing member 44, it is compared to a preset slip value $S_0$ which corresponds to the optimum set-point, for example. The differential amount is transferred to a slip regulator 46 the output of which is provided to the summing member 38. The block 48 onto which the output of the slip regulator 46 is initially provided takes care that the "corrective moment" is passed on to the summing member 38 only if the slip measured is larger than the predetermined slip $S_0$. As is known the differential amount then becomes negative. Therefore, only a negatively corrective moment is transferred to the summing member 38 in order that the torque of the motor 30 be reduced accordingly with a view to reducing the driving power on the wheel 14 or the braking power.

To cancel the preceding absolute-value formation in the block 36 again after the corrective intervention by the slip regulator 46 and to cause the torque setpoint $M_{soll}$ to act on the drive with the correct sign the sign determined in the block 44 is multiplied up again and is provided at the output 52.

The above described method is capable of determining the slip at any time during a straight-line travel. During cornering, the speed was measured at two points of the vehicle (wheels 10, 12) in order to determine the speed vector $\overline{V}_{ref}$ (the reference speed) on the drive 14. A description of how to determine the reference speed has already been made earlier. The reference speed or its vector allow to calculate the circumferential speed and the axial component therefrom. The circumferential component is that speed which is resorted to for the determination of the actual slip. The axial component reflects the extent of the lateral slip of the wheel 14 which should not exceed a certain degree either, if ever possible. For example, a provision can be made here for an intervention into the steering mechanism which is such as to avoid any further increase in the steering angle α. It is also possible to slightly reduce the steering angle or to take other measures which are prone to reduce the lateral slip.

What is claimed is:

1. A method for influencing the traction or braking torque on at least one driving wheel of an industrial truck in contact with a floor or ground, the driving wheel being driven by a driving motor, wherein the slip between the driving wheel and the floor or ground is measured or calculated by comparing the circumferential speed of the driving wheel and the measured travelling speed of the industrial truck, the such determined slip being compared with a predetermined value for the slip, and the absolute amount of the torque of the driving motor is reduced in dependence from the difference between the actual and the predetermined value for the slip through a slip controller if the actual slip exceeds the predetermined slip, an intervention of the slip controller takes place in response to a rpm governor which has a desired torque as an output and the output of which, after undergoing correction by the slip controller, is fed to a secondary order torgue regulation circuit.

2. The method according to claim 1, characterized in that the driving motor (30) is an electric motor or hydraulic engine.

3. The method according to claim 2, characterized in that a three-phase a.c. motor is provided.

4. The method according to claim 1, characterized in that the vehicle travelling speed is determined from the number of revolutions of at least one non-driven wheel (10, 12) of the industrial truck.

5. The method according to claim 2, characterized in that the vehicle travelling speed is determined from the number of revolutions of at least one non-driven wheel (10, 12) of the industrial truck.

6. The method according to claim 3, characterized in that the vehicle travelling speed is determined from the number of revolutions of at least one non-driven wheel (10, 12) of the industrial truck.

7. The method according to claim 1, characterized in that the vehicle travelling speed is determined from the number of revolutions of at least one non-driven wheel (10, 12) of the industrial truck.

8. The method according to claim 1, characterized in that the speed is measured on two non-driven wheels (10, 12) in order to determine a reference speed on the driving wheel (14) as a vector quantity direction and magnitude from the vehicle geometry.

9. The method according to claim 2, characterized in that the speed is measured on two non-driven wheels (10, 12) in order to determine a reference speed on the driving wheel (14) as a vector quantity direction and magnitude from the vehicle geometry.

10. The method according to claim 3, characterized in that the speed is measured on two non-driven wheels (10, 12) in order to determine a reference speed on the driving wheel (14) as a vector quantity direction and magnitude from the vehicle geometry.

11. The method according to claim 1, characterized in that the speed is measured on two non-driven wheels (10, 12) in order to determine a reference speed on the driving wheel (14) as a vector quantity direction and magnitude from the vehicle geometry.

12. The method according to claim 2, characterized in that the speed is measured on two non-driven wheels (10, 12) in order to determine a reference speed on the driving wheel (14) as a vector quantity direction and magnitude from the vehicle geometry.

13. The method according to claim 8, characterized in that a calculation of a circumferential component and/or an axial component of the reference speed is performed by measuring a steering angle on the driving wheel (14).

14. The method according to claim 1, characterized in that the desired slip for a certain friction pairing is constituted by an optimum slip value.

15. The method according to claim 2, characterized in that a desired slip for a certain friction pairing is constituted by an optimum slip value.

16. The method according to claim 3, characterized in that a desired slip for a certain friction pairing is constituted by an optimum slip value.

17. The method according to claim 1, characterized in that a desired slip for a certain friction pairing is constituted by an optimum slip value.

18. The method according to claim 2, characterized in that a desired slip for a certain friction pairing is constituted by an optimum slip value.

19. The method according to claim 3, characterized in that a desired slip for a certain friction pairing is constituted by an optimum slip value.

20. The method according to claim 4, characterized in that a desired slip for a certain friction pairing is constituted by an optimum slip value.

21. The method according to claim 1, characterized in that a desired slip is determined while the industrial truck is in operation.

22. The method according to claim 8, characterized in that an axial speed component is determined from the reference speed of the driving wheel (14) and the steering angle is limited or reduced if the axial speed component exceeds a preset point.

23. The method according to claim 13, characterized in that an axial speed component is determined from the reference speed of the driving wheel (14) and the steering angle is limited reduced if the axial speed component exceeds a preset point.

* * * * *